Figure 6:
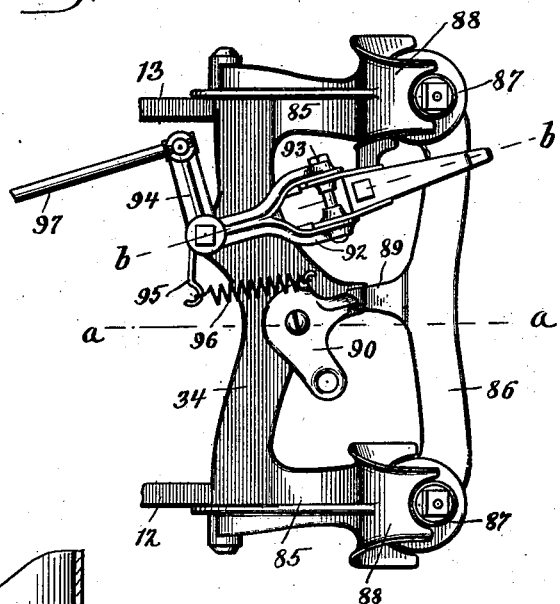

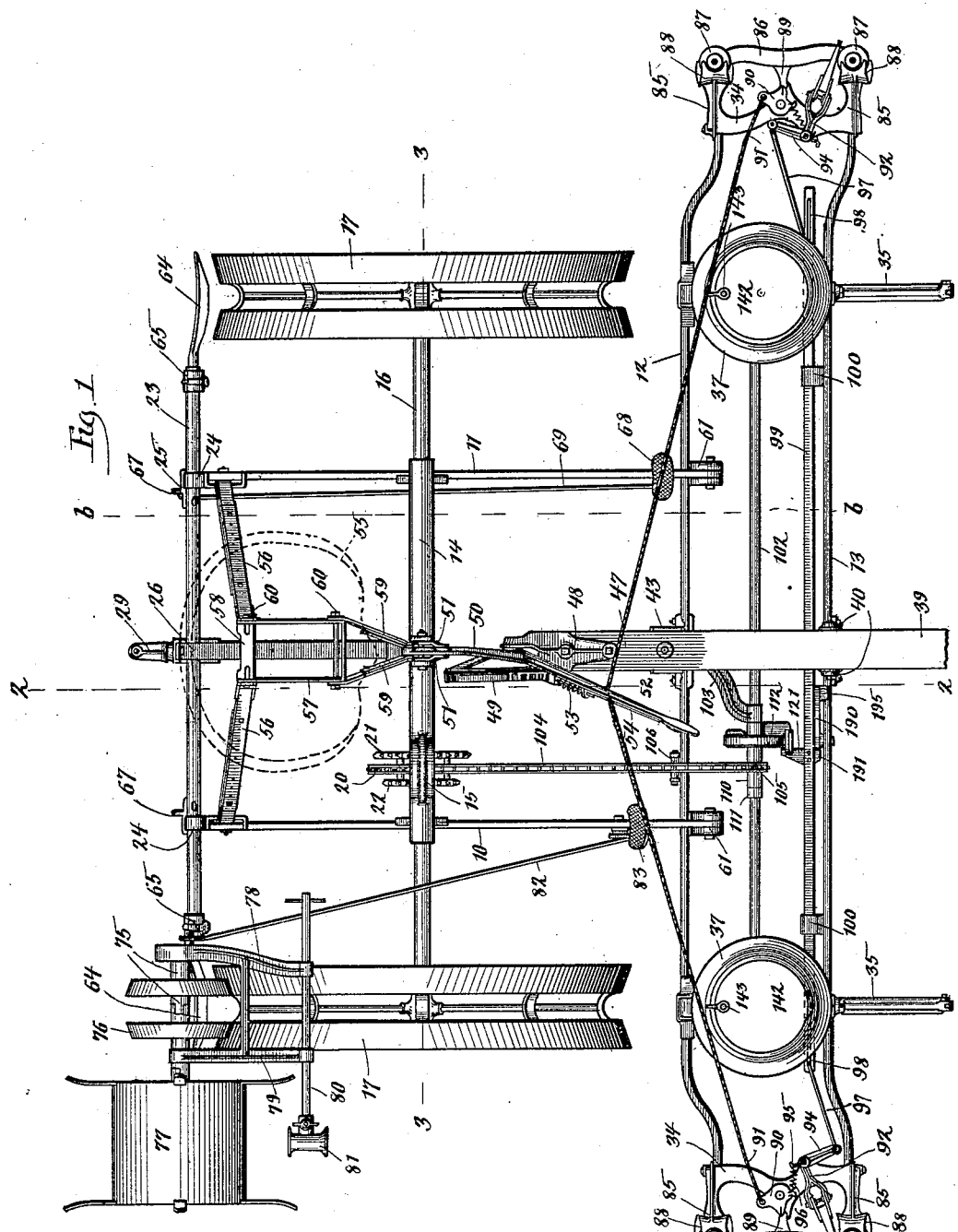

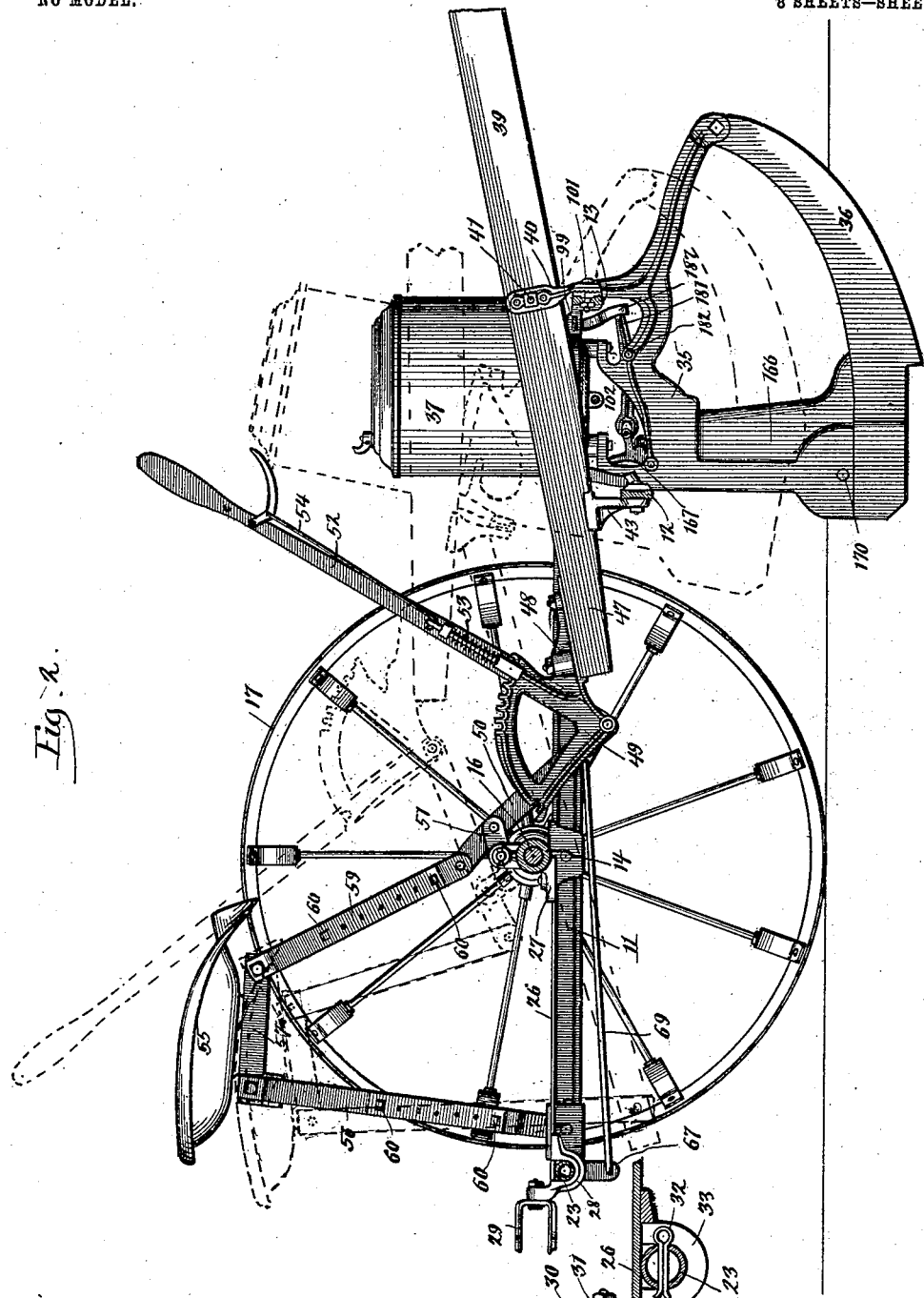

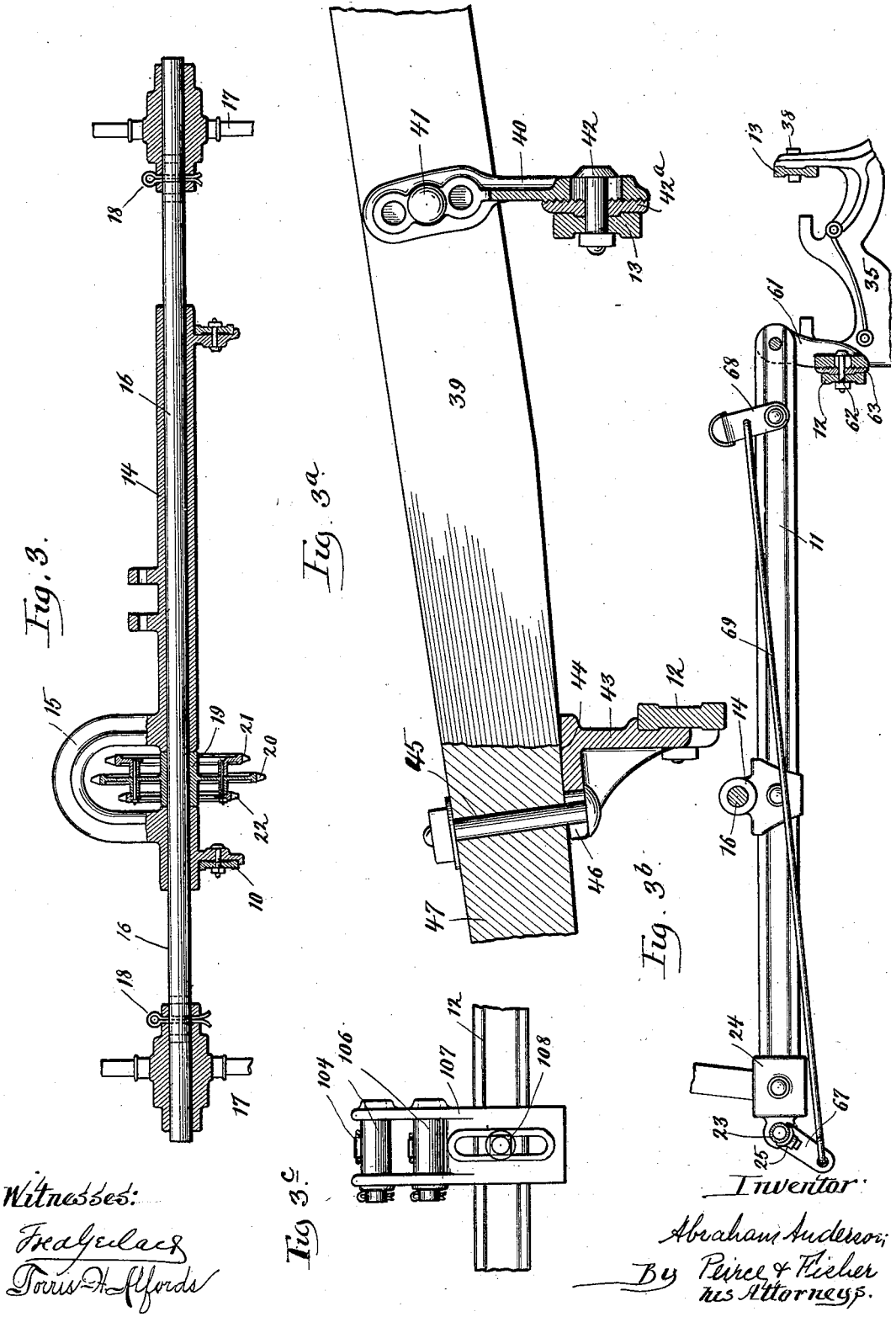

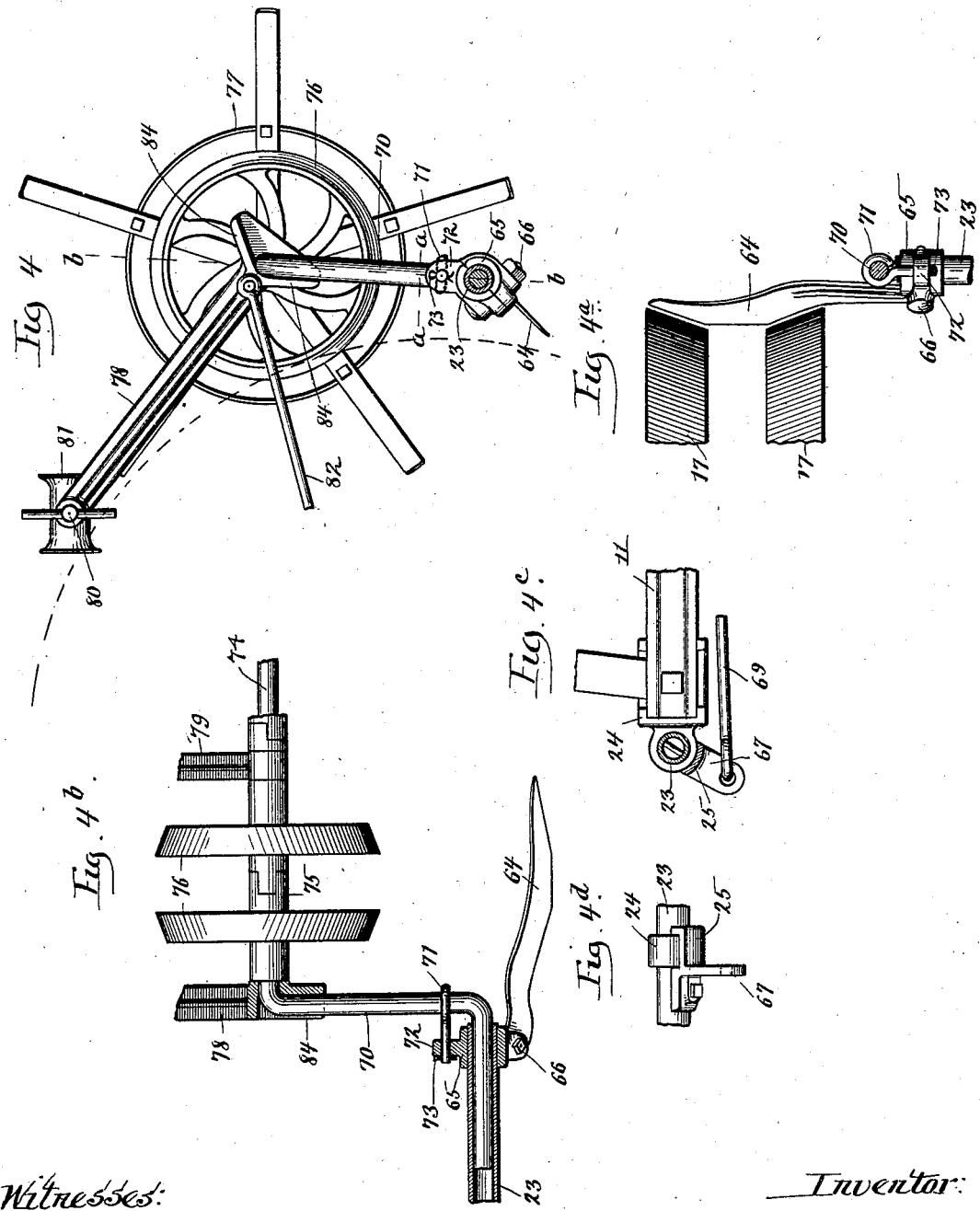

No. 722,442. PATENTED MAR. 10, 1903.
A. ANDERSON.
COMBINED CHECK ROW AND DRILL PLANTER.
APPLICATION FILED OCT. 12, 1901.
NO MODEL. 8 SHEETS—SHEET 5.
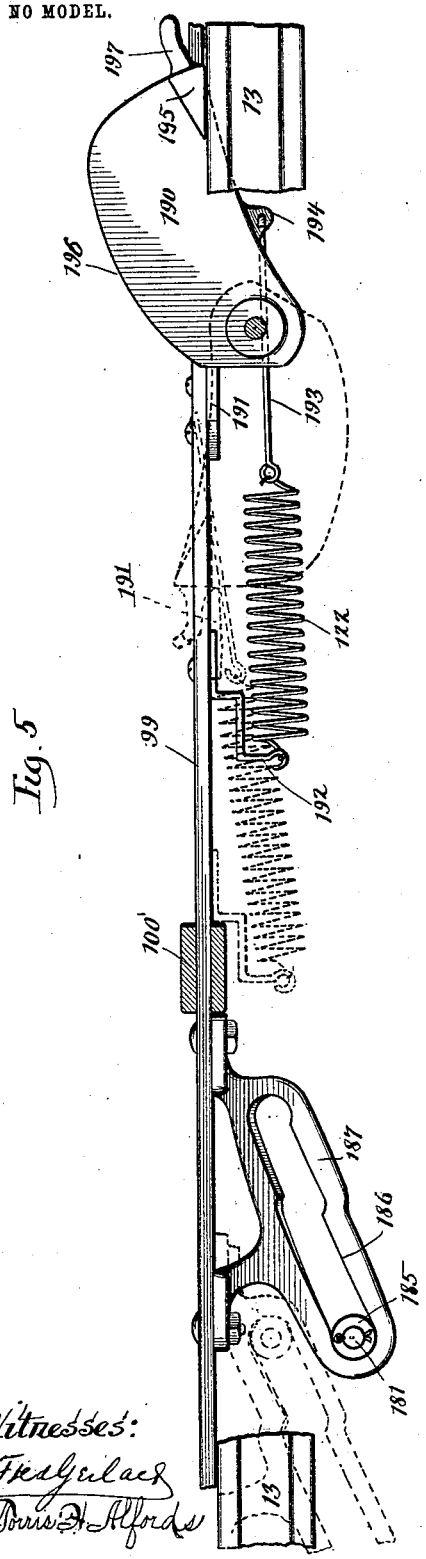
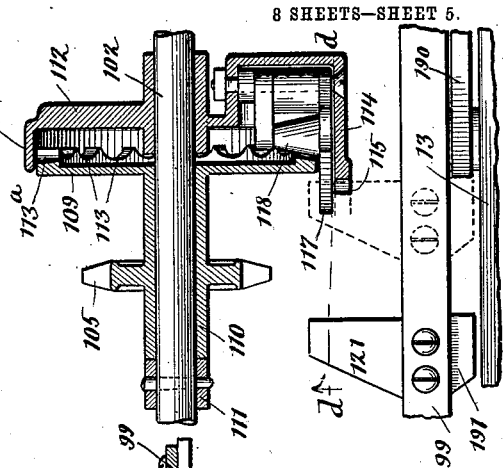
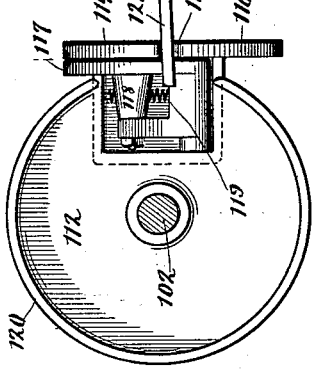
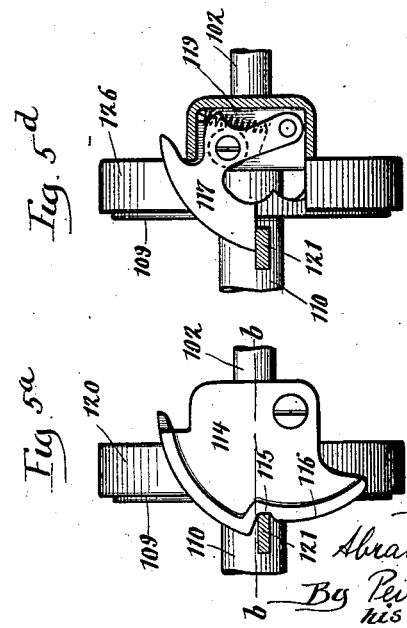

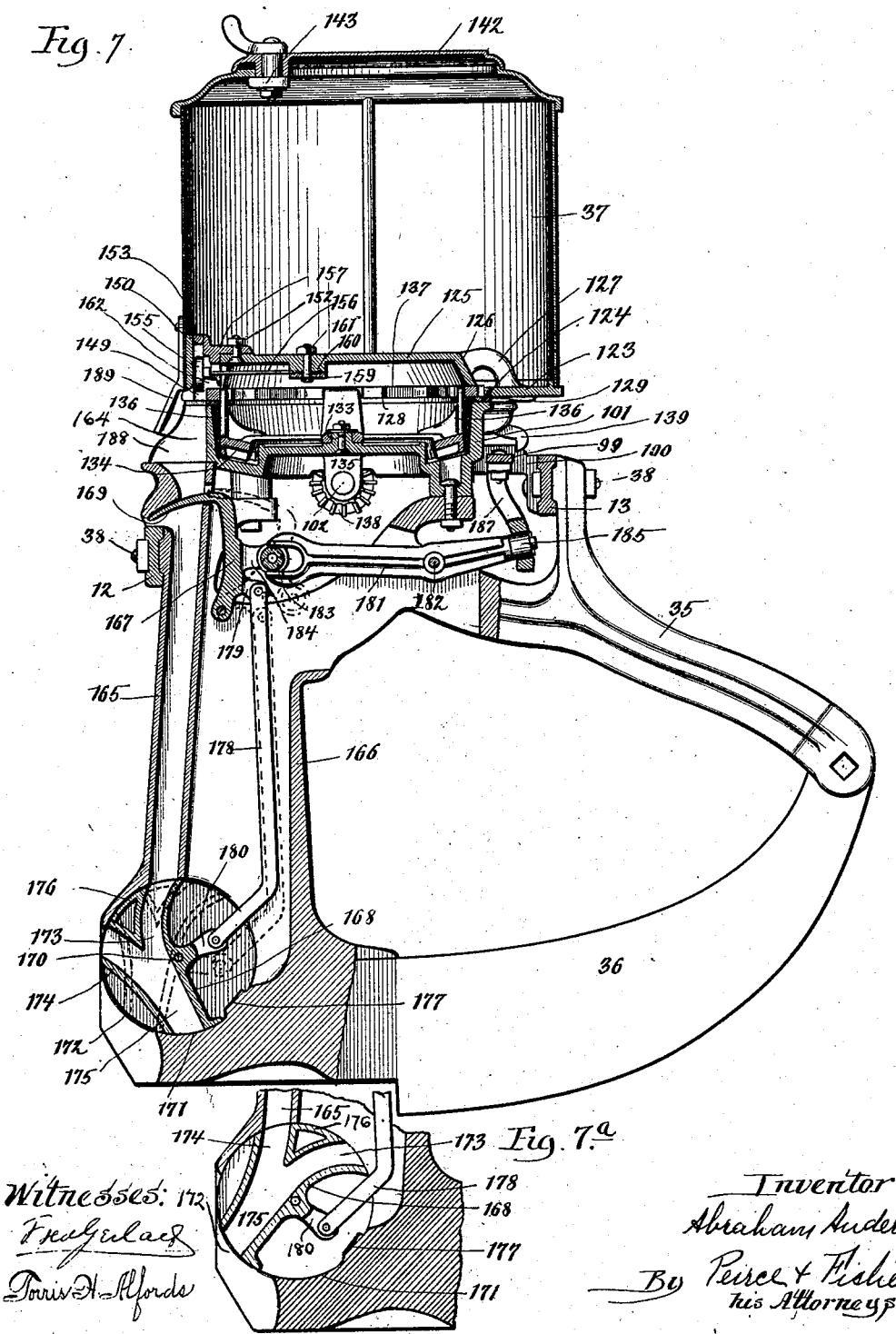

No. 722,442. PATENTED MAR. 10, 1903.
A. ANDERSON.
COMBINED CHECK ROW AND DRILL PLANTER.
APPLICATION FILED OCT. 12, 1901.
NO MODEL. 8 SHEETS—SHEET 8.
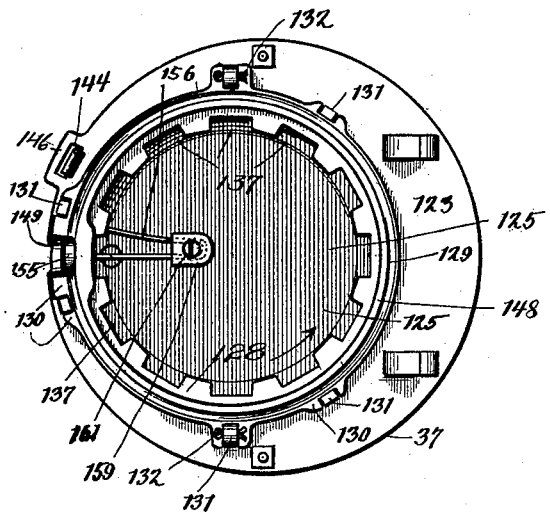
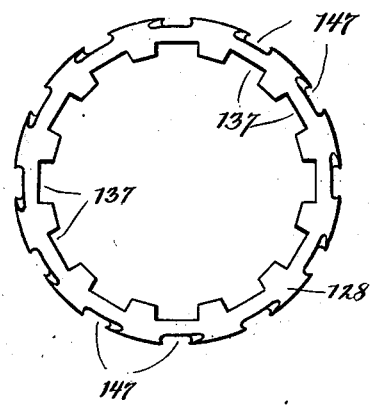
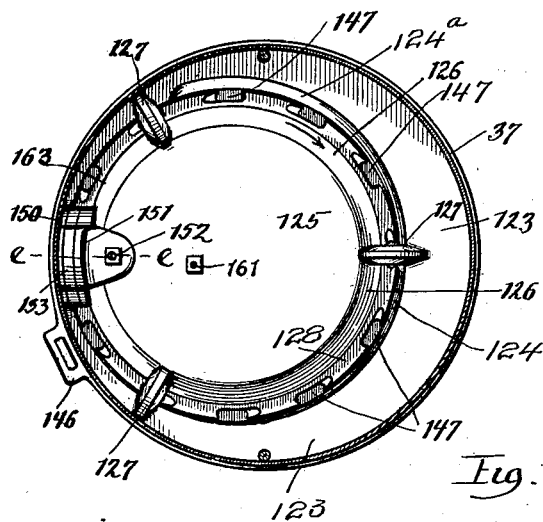
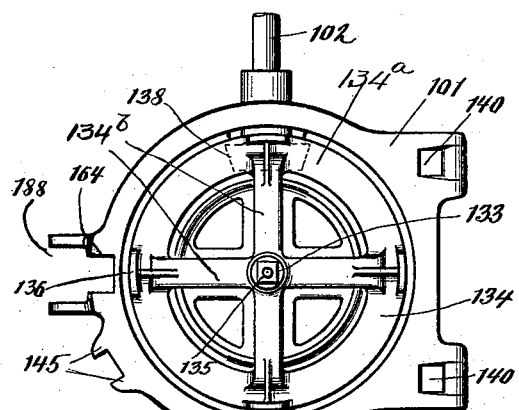
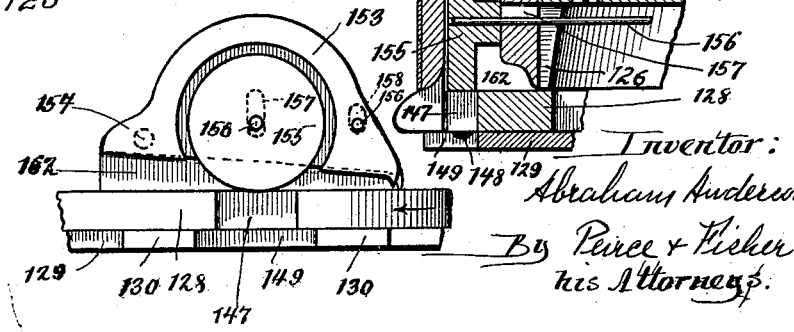

UNITED STATES PATENT OFFICE.

ABRAHAM ANDERSON, OF GALESBURG, ILLINOIS.

COMBINED CHECK-ROW AND DRILL PLANTER.

SPECIFICATION forming part of Letters Patent No. 722,442, dated March 10, 1903.

Application filed October 12, 1901. Serial No. 78,452. (No model.)

*To all whom it may concern:*

Be it known that I, ABRAHAM ANDERSON, a citizen of the United States, and a resident of Galesburg, county of Knox, and State of Illinois, have invented certain new and useful Improvements in a Combined Check-Row and Drill Planter, of which the following is declared to be a full, clear, and exact description.

Although some of the improvements are applicable to planters of various kinds, they are shown in connection with that class in which the seed-plate is driven from the wheel shaft or axle for separating the seed and delivering the same one at a time to the seed-tube and in which the drop-valve in the seed-tube is actuated for hill-planting by the check-row devices. In such planters clutch mechanism controlled by the check-row device are preferably interposed in the drive-gear for the seed-plate, so that the latter will be driven through uniform predetermined distances between each of the checks or knots on the operating-line in spite of the slipping or ununiform rotation of the traction or supporting wheels upon the drive shaft or axle.

The objects of the present invention are to improve the construction of the clutch mechanism of the seed-dropping valves and of the trip mechanism controlling the clutch and valves, whereby these parts may be quickly and easily adjusted for check-rowing or drill-planting and will operate with accuracy and certainty in either case.

The invention also seeks to improve the construction of the seed measuring and separating devices in the seed-can or hopper, by which single grains will be readily taken up by each of the cups in the seed-plate, arranged edgewise therein, and delivered with certainty and regularity therefrom to the seed-tube.

Further objects are to simplify and improve the arrangement of the seed cut-off and ejector, to provide an improved form of removable or tilting hopper or seed-can with a seed-plate so connected to its bottom that it may be removed therefrom without necessitating the removal of the grain contents of the can, and to provide a suitable gear on a fixed pivot below the can for operating the seed-plate.

Still further objects are to provide a shift-lever connecting the main frame and the runner-frame and a pivotally-mounted driver's seat connected to the lever, so that the seat is maintained in level position in all adjustments of the lever and the weight of the runner-frame balanced by the driver's weight in riding position; to provide a scraper-bar which will serve as a connecting member between the side bars of the main frame and as a support for a marker-holder held centrally thereon; to provide an improved check-line reel mechanism arranged to be mounted on either end of the scraper-bar, and to provide adjustable connections between the draft-tongue and the runner-frame and between the runner-frame and the main frame by which the runners or furrow-shoes may be accurately held in proper position, and in general to provide a planter of as light weight as consistent with proper strength.

Further objects are hereinafter described; and for carrying into effect the various purposes the invention consists in the features of construction, arrangements, and combinations of parts set forth in the following description, illustrated in the accompanying drawings, and particularly set forth in the appended claims.

In the drawings, in which like reference-numerals indicate like parts throughout, Figure 1 is a top plan view of the planter. Fig. 2 is a sectional elevation on line 2 2 of Fig. 1. Fig. 2ᵃ is a detail sectional view of the marker-holder and its support. Fig. 3 is a detail section on line 3 3 of Fig. 1 through the wheel shaft or axle. Fig. 3ᵃ is a detail view, partially in section, showing the connections between the draft-tongue and the runner-frame. Fig. 3ᵇ is a detail longitudinal section of the planter on line *b b* of Fig 1. Fig. 3ᶜ is a detail view of the chain-tightener. Fig. 4 is an enlarged side elevation of the check-line reel and its support. Figs. 4ᵃ and 4ᵇ are detail sections on lines *a a* and *b b*, respectively, of Fig. 4. Fig. 4ᶜ is an enlarged detail side view of the connection between the scraper-bar and the frame. Fig. 4ᵈ is a detail rear view of the same. Fig. 5 is a detail view in elevation of the trip-bar and connections. Fig. 5ᵃ is a detail side view of the improved clutch. Fig. 5ᵇ is a section on line *b b* of Fig. 5ᵃ.

Figure 7B:
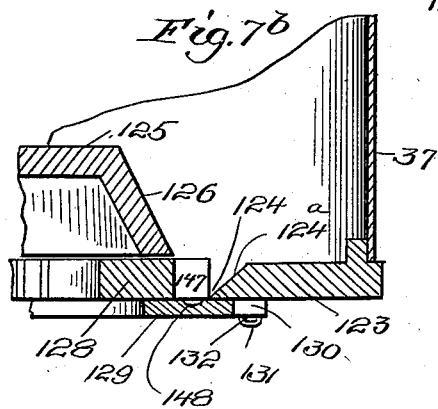
Figure 6A:
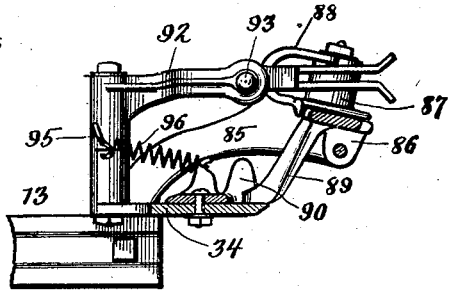
Figure 6C:
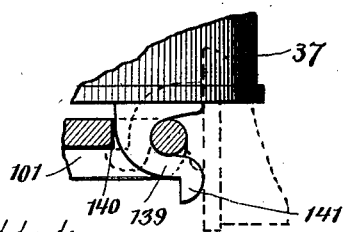
Figure 6B:
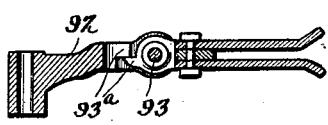

Fig. 5$^c$ is a face view of one of the clutch members. Fig. 5$^d$ is a section on line $d\,d$ of Fig. 5$^b$. Fig. 6 is a detail plan view of the check-row head. Fig. 6$^a$ is a sectional elevation of the same on line $a\,a$ of Fig. 6. Fig. 6$^b$ is a detail section of the check-row fork on line $b\,b$ of Fig. 6. Fig. 6$^c$ is a detail view of the detachable hinge connection for the seed-can or hopper. Fig. 7 is an enlarged sectional elevation through the seed-can or hopper and the seed-delivery tube. Fig. 7$^a$ is a detail view showing the drop-valve in position for drill-planting. Fig. 7$^b$ is an enlarged detail section of a portion of the can-bottom. Fig. 8 is a bottom view of the seed-can. Fig. 8$^a$ is a plan view of the seed-plate. Fig. 8$^b$ is a sectional plan view of the seed-can. Fig. 8$^c$ is a plan view of the seed-can support with the can removed. Fig. 8$^d$ is a detail elevational view of the cut-off and ejector. Fig. 8$^e$ is a detail section on line $e\,e$ of Fig. 8$^b$.

The planter comprises the rear main or wheel frame and a front or runner frame. The side pieces 10 and 11 of rear wheel or main frame and the longitudinal pieces 12 13 of the front or runner frame, which is hinged or pivoted to the wheel-frame, are preferably formed of wrought-iron or steel I-bars set edgewise. The side bars 10 11 are rigidly connected intermediate their ends by a tubular cross member 14, (see Fig. 3,) which is formed in two portions rigidly connected by an arch 15, such portions being preferably formed in one piece with the arch. The tubular cross member 14 not only serves as a connecting-brace between side bars 10 11, but also forms journal-boxes for the transverse drive shaft or axle 16, to which are adjustably connected the supporting and cover wheels 17 by keys 18, arranged to engage one of a series of holes in the ends of shaft 16. The hubs of wheels 17 may, if desired, be provided with any sort of suitable clutch mechanism, so that the machine may be easily backed or turned. A hub 19 is fixed to shaft 16 intermediate the parts of tubular member 14 and serves to hold the shaft against longitudinal movement and to support a series of drive sprocket-wheels 20, 21, and 22 of varying sizes beneath the arch 15.

A tubular scraper-bar 23 is journaled in cast supporting-blocks 24, bolted to the rear ends of side bars 10 11, (see Figs. 1, 3$^b$, 4$^c$, and 4$^d$,) and bent straps 25 are fixed to the scraper-bar and arranged to engage both sides of the round heads upon supports 24, so that the scraper-bar serves as a connnection between the rear ends of side bars 10 11, thus dispensing with the usual rear transverse frame member.

A central longitudinal brace-strap 26 (see Figs. 2 and 2$^a$) is secured to a rearwardly-projecting lug 27 on the cross member 14 and to a cast supporting-piece 28, loosely mounted upon the scraper-bar 23. A U-shaped marker-holder 29 is pivotally held upon a rearwardly-projecting stud 30 on support 28 by a bolt 31, which also serves to connect the support and the upwardly-turned end of strap 26. A key 32, fixed in a hole in bar 23, engages a slot 33 in support 28 and serves to hold the marker-holder 29 in central position when in use.

The ends of the longitudinal bars 12 and 13 of the runner-frame are bent forwardly and connected by the check-row heads 34. (See Fig. 1.) Irregular-shaped castings or runners 35, carrying the furrow-shoes 36 and seed-cans 37, are secured between the bars 12 and 13 by bolts 38, as most clearly shown in Fig. 7. The runner and other parts connected to I-bars 12 13 are provided with offsets which fit in the longitudinal recesses in the sides of these bars, so as to be rigidly held against lateral strain. For varying the distance between rows the runners and parts carried thereby may be adjusted in position upon the bars 12 13, which may be provided in the usual manner with a series of holes for bolts 38.

A draft-tongue 39 (see Figs. 2, 3$^a$) is mounted on rear and front supports secured, respectively, to the bars 12 and 13. The front support comprises a pair of vertical straps 40, having a series of holes for a bolt 41, by which tongue 39 is adjustably secured between them in order that the shoes 36 may be brought to properly bear in the ground with teams of different sizes. For more accurate adjustment the lower ends of straps 40 are provided with vertical slots, through each of which pass a clamping-bolt 42, and a clamping-plate 42$^a$ is interposed between the lower ends of the straps 40 and bar 13 and has an offset which engages the recess in the bar, while the engaging faces of the plate and straps are corrugated, as shown. The rear support 43 for the tongue has a convex upper face 44, upon which the tongue rests, so that a broad bearing is provided for the latter in all of its adjusted positions. A bolt 45 passes through the tongue and engages a slot 46 in the casting to hold the former securely in place.

The runner-frame is provided with a rear extension 47, conveniently formed by extending the tongue 39 rearwardly a short distance, to which is fixed, by a bracket-arm 48, a sector-shaped rack-bar or quadrant 49. (See Figs. 1 and 2.) A shift-lever 50 is pivotally connected to the shaft-support 14 by a pair of short links 51, is bent upwardly at its forward end to form a locking hand-lever 52, and is pivotally connected at said bend to the quadrant 49. Hand-lever 52 is provided with the usual spring-held locking-dog 53 and trip-rod 54 therefor.

A driver's seat 55 is mounted upon front and rear supports. The rear support comprises a pair of inclined bars or straps 56, (see Fig. 1,) pivotally connected at their lower ends to the rear ends of side bars 10 11 and rigidly connected at their upper ends to the rear ends of a U-shaped seat-frame 57, which ends are held apart by a cast piece 58. The front support for the seat also comprises a pair of bars or straps 59, pivoted at their upper ends to the front end of seat-frame 57 and at their lower ends to the rear end of shift-lever 50, as most clearly shown in Fig. 2. By thus connecting one of the seat-supports to the shifter-bar the seat may be maintained in a comfortable substantially level position both when the runner-frame is lowered for planting, as shown in full lines in Fig. 2, and when it is in the raised position, (shown by dotted lines,) in spite of the tilting movement of the frame. Moreover, the arrangement is such that as the runner-frame is raised the lower ends of supports 59 and links 51 are moved rearwardly and the driver's weight is thrown upon the rear end of shifter-bar 50 and assists in raising the runner-frame and relieves the yoke, which is upheld by the team at the forward end of the draft-tongue from the weight of the runner-frame in raised position. When, however, the runner-frame is lowered, the lower ends of supports 59 and links 51 are moved forward and the thrust of the driver's weight upon the shifter-bar tends to hold the furrow-shoes of the runner-frame in the ground; but the thrust of the driver's weight through the rear supports 56 upon the rear end of the main frame still tends to balance the downward drag of the runner-frame, which of course is not so great as when it is in the raised position. The driver's weight is thus utilized to balance the weight of the runner-frame both in planting and riding positions. Each of the supporting-straps 56 and 59 are composed of overlapping pieces, one of which is connected to the seat and the other to the frame or to the shifter-bar, and which are provided with a series of holes spaced at regular distances apart for connecting-bolts 60, so that the seat may be adjusted to any desired height or angle to suit the driver.

Connecting hinge-pieces 61, (see Figs. 1 and 3$^b$,) to which the forward ends of side bars 10 11 are pivoted, are adjustably secured to the runner-frame bar 12, and for this purpose each is provided with a vertical slot in its lower end, through which extends a clamping-bolt 62. A clamping-plate 63 is interposed between the hinge-pieces 61 and bar 12 and has an offset engaging the recess in the bar, while the engaging faces of the plate and hinge-piece are corrugated, as shown. The runner-frame may be thus raised or lowered at either end to cause the furrow-shoes to bear equally in the ground.

The scraper-blades 64, projected downwardly and to one side of the scraper-bar 23, are preferably formed in one piece with split sleeves 65, having a clamp-bolt 66, so that they may be adjusted either about the bar 23 to and from the rim of the cover-wheels 17 or longitudinally upon the bar. The straps 25, fixed on the scraper-bar, are provided with downwardly-projecting arms 67. (See Figs. 3$^b$, 4$^c$, 4$^d$.) A foot-treadle 68 (see Figs. 1, 3$^b$) is pivoted to either one of the side bars 10 or 11, and a link 69, connected thereto, has a looped or hooked end engaging one of the arms 67 for operating the scraper-bar. The parts are so arranged that the ends of the supports 24 on the side bars 10 11 and the straps 25 on scraper-bar 23 act as stops to prevent the scrapers 64 from being moved into actual contact with wheels 17, (see Fig. 4$^a$,) thus saving unnecessary wear on these parts.

A bent reel-support 70 (see Figs. 1, 4, 4$^a$, and 4$^b$) is arranged to be pivotally mounted within either end of the tubular scraper-bar 23 and is held in upright position, but slightly inclined toward the rear and against endwise displacement, by an eyebolt 71. (See Figs. 1, 4, 4$^a$, and 4$^b$.) The shank of the eyebolt 71 is loosely held within an opening in a lug 72 on the scraper-supporting sleeve 65 by a split key 73, so as to permit a slight oscillatory movement of the support 70 in the scraper-bar. A horizontally-projecting shaft 74 is mounted on the upper end of support 70 and is preferably formed in piece therewith. Loosely journaled on the shaft, but connected by the interengaging coupling-sleeves 75, are the two-part friction-pulley 76 and the check-line reel 77. A pair of connected arms 78 and 79 are mounted to swing about the shaft 74, the inner one, 78, being swiveled directly upon the shaft and the outer arm 79 upon one of the coupling-sleeves. A round rod 80, carrying a tubular guide 81 at its outer end, is swiveled in and is longitudinally adjustable through the outer ends of arms 78 and 79. An operating-rod 82 is pivotally connected to the arm 78 near its lower pivoted end and to a foot-treadle 83, (see Fig. 1,) pivoted to the side bar 10 near its forward end, by which means the reel-support 70 may be swung forward to bring the friction-pulley 76 into contact with the rim of the adjacent wheel 17. The arm 78 is provided at its inner end with a pair of diverging stops 84, spaced apart on either side of the upper end of support 70, so that the arms 78 79 and guide 81, carried thereby, may be swung in either direction and projected in front of the reel 77 when the reel is carried either on the right or left hand end of scraper-bar 23. The guide-supporting arms 78 79 will be held in such forwardly-projected position by the pull of the connecting-rod 82 with one or the other of the stops 84 in engagement with the arm 70, according as the reel is placed upon one or the other end of the scraper-bar. In Fig. 1 the reel and its operating-rod 82 and treadle 83 is mounted on the right-hand side of the frame and the operating-rod 69 and treadle 68 for the scraper-bar upon the left-hand side. If it is desired to change the position of the reel to the other side, the positions of operating foot-treadles 83 and 68 and the connecting-links 82 and 69 will be interchanged. As above described, the guide 81 may be adjusted back and forth by hand to guide the check-line evenly on all portions of the reel and may be turned as the size of the coil on the reel increases to evenly guide the line. By connecting the support 70 to the lug 72 on sleeve 65 both the scraper 64 and the friction-pulley 76 may be positioned to accurately engage the wheel-rim by a single adjustment of the sleeve.

The check-row heads 34 (see Figs. 6 and 6ª) comprise a base portion rigidly connected to the bars 12 and 13 of the runner-frame and having at each end the outwardly and upwardly extending arms 85. A guide-support 86 is pivoted between the ends of arms 86 and carries the check-line guide-rolls 87, normally arranged adjacent the curved guides 88, formed upon the ends of the arms. A projection 89 upon the guide-support 86 is engaged by a spring-held latch 90, pivoted to the base-plate of the check-row head, and a flexible-cord connection 91 extends from each of said latches to shifter hand-lever 52. (See Fig. 1.) Cords 91 are sufficiently slack to permit the adjustment of the furrow-shoes 36 in the ground while planting; but when the latter are raised clear of the ground at the end of the row the latches 90 will be operated to release the guide-supports 86, which will swing outwardly and automatically release the check-row line. The driver may thus give his whole attention to guiding the team at the turn, the check-line being released and the seeding devices being invariably brought to a standstill by the shift of the hand-lever. The check-row forks 92 are pivoted upon the head to swing in a horizontal plane and are also jointed, as at 93, (see Fig. 6ᵇ,) so that the outer end may swing in a vertical plane with any vertical movement of the check-row line. In this way cramping of the line and all unnecessary wear of the line upon the fork is avoided. Stops 93ª (see Fig. 6ᵇ) upon opposite parts of the jointed fork 92 prevent the outer end from dropping below a horizontal position when freed from the check-line. The hub of each fork is provided on one side with an arm 94 and on the opposite side with a hook 95, connected by a spring 96 to the latch 90, by which each of the forks are held in their normal forward position. Links 96, pivoted to the ends of arms 94, engage slots 98 in the ends of a reciprocating trip-bar 99, which is mounted to slide in guides 100, fixed to the forward bar 13 of the runner-frame. One of the links engages the outer end of its slot and the other the inner end of the other slot, as shown in Fig. 1, so that the trip-bar 99 will be shifted in the same direction (or toward the right-hand side of the planter) by each of the forks. Moreover, by providing the slotted loose one-way connection the trip-bar 99 may be shifted, as hereinafter described, independently of the forks for drill-planting. As shown in Fig. 1, the forks are duplicates and when worn on one side by the checks on the line may be interchanged to present a new face to the checks or tappets.

Supports 101 (see Fig. 7) for the seed-cans 37 are bolted to the upper end of the runner 35, and a seed-shaft 102 is journaled at either end in such supports and in an arm 103, centrally fixed to bar 12. (See Fig. 1.) The seed-shaft is driven from the wheel-axles 16, preferably by a chain 104, passing over one of the sprockets 20, 21, or 22 upon the axle and a sprocket 105 on the clutch mechanism, hereinafter described. A pair of tightening rolls or idlers 106, (see Figs. 1, 3ᶜ,) arranged to engage both the upper and lower sides of the chains 104, are mounted on a vertically-adjustable support 107, secured by a bolt-and-slot connection 108 to the bar 12 of the runner-frame.

The clutch mechanism (see Figs. 5ª, 5ᵇ, 5ᶜ, and 5ᵈ) comprises a disk or clutch member 109, attached to the sprocket 105, preferably by means of a sleeve 110, formed in piece with both of these parts and loosely mounted upon the shaft 102. Sleeve 110 is held against longitudinal movement on the shaft between a collar 111 and the hub of a second disk or clutch member 112, which are fixed to the shaft. The face of disk 109, adjacent the disk 112, is provided with peripheral notches 113, cut upon a laterally-projecting flange or shoulder 113ª. A segmental-shaped plate or arm 114 is fixed to or formed in piece with the disk 112 and is arranged at right angles thereto on the periphery of said disk. The edge of the plate or arm 114 is provided with a notch 115 and a cam-surface 116 on one side of the notch. A dog 117 is pivoted within a recess in the disk 112, so as to swing at right angles thereto adjacent the plate or arm 114. This dog carries a conical roller 118 and a compression-spring 119, arranged intermediate the dog, and the disk 112 normally holds the conical roller into engagement with one of the correspondingly-shaped notches 113 upon the disk 109. A lateral flange or rim 120, upon the disk 112, surrounds the notched disk 109 and protects the operating parts of the clutch from dirt, &c. The trip-rod 99 carries an arm or detent 121, which is normally held when the trip is set for check-row planting by a spring 122, (see Fig. 5,) as hereinafter described, into engagement with the notch 115 of arm 114, as shown in dotted lines in Fig. 5ᵇ and in full lines in Figs. 5ª, 5ᶜ, and 5ᵈ. In this position the detent will engage the end of the dog 117 and hold it back against the tension of spring 119 with the roller 118 out of engagement with the notched disk 109. The latter is thus free to revolve without moving the shaft 102 and the seeding devices operated thereby. The detent 121 is tripped or drawn back in check-rowing by one of the tappets on the check-row line acting through the medium of one of the forks 92 and its connecting-link 97 to slide the reciprocating trip-bar 99 and bring the detent 121 into the position shown in full lines in Fig. 5ᵇ. Spring 119 will then act upon the dog 117 to force the roller carried thereby into engagement with the continuously-driven clutch-disk 109, and the seed-shaft will be rotated. As soon as the fork 92 is released by the check or knot on the line the trip-bar 99 will be returned by the spring 122 to bring detent 121 into engagement with the clutch, and when the shaft 102 and disk 112 have completed a single revolution the cam-surface 116 on arm or plate 114 will engage the detent 121, force it backward slightly against the tension of spring 122 until it engages the notch 115. At the same time the dog 117 will engage the detent 121, and its roller 118 will be tripped out of engagement with notched disk 109. The seed-shaft 102 will thus be arrested and locked in normal position after a single complete revolution.

The seed mechanism of the right-hand seed-can is illustrated in Fig. 7, it being understood that the mechanism of the other seed-can is similar in construction.

The bottom 123 of the seed-can 37 is preferably of cast metal and is formed with a circular opening 124 eccentrically arranged and approximately tangent with the edge of the bottom at the rear of the can. (See Figs. 8, 8$^b$.) A cap-plate 125 is arranged concentrically above the opening and is provided with a peripheral annular downwardly-inclined flange 126, the lower edge of which is spaced apart from the edge of the opening 124 and is arranged at or slightly above the upper face of bottom 123, as most clearly shown in Figs. 7 and 7$^b$. The cap-plate is preferably held in the position described by the upwardly-curved connecting-pieces 127, extending between the plate and the bottom 123 and preferably cast in one piece with these parts. (See Figs. 7, 7$^b$, 8$^b$.) The annular seed-plate 128, slightly smaller in diameter than the opening 124, is placed within the same, and practically in the plane of the can-bottom 123. It is held in such position against the flange 126 with its edge projecting beyond the edge of the flange, (see Figs. 7, 7$^b$, and 8$^b$,) but so as to be free to rotate by a ring or annular plate 129. The rim of plate or ring 129 is provided with lugs 130, engaging opposite sides of projections 131 upon the bottom of the can and is removably held in place by a pair of split keys 132, engaging openings in an oppositely-disposed pair of projections. (See Fig. 8.)

The seed-can support 101 is recessed or cup-shaped, as shown, and is provided with a central upwardly-projecting stud 133, upon which the hub of a drive wheel or gear 134 is journaled. The gear 134 (see Figs. 7 and 8$^c$) comprises a rim 134$^a$, having gear-teeth downwardly projecting into an annular recess in the support 101, and which is connected to its central hub by radial arms 134$^b$. The gear is held in place by a bolt 135, extending through the stud 133 and provided at its upper end with a nut and washer engaging the hub of the gear. Peripheral upwardly-extending arms 136 upon the gear are arranged to engage notches 137 cut on the inner edge of the annular seed-plate, so that the gear and plate will be driven together by a beveled pinion 138, fixed upon the shaft 102 and engaging the teeth of the gear. The support 101 is provided with a peripheral upwardly-projecting flange having a flat upper face upon which the seed-can 37 rests. The latter is provided with a pair of downwardly and outwardly curved lugs or hinge-pieces 139, (see Fig. 6$^c$,) which are arranged to engage openings 140 in the upper face of support 101. (See Fig. 8$^c$.) The outer sides of these openings are circular in cross-section to form pivots about which the seed-can may be swung into the position shown in dotted lines in Fig. 6$^c$. The can will be held in the latter position by stops 141 upon the ends of the curved lugs 139, which are arranged to engage the inner edges of openings 140. In this way the can may be tilted for inspection of the working parts or for convenient removal or change of the seed-plate without first emptying the can, as is necessary with most prior constructions. Moreover, the lugs 139 and the openings 140 are so shaped that the can may be entirely removed and inverted for easy removal of the seed-plate 128, after first removing the holding-ring 129, without emptying the can, since the latter is provided with the closure or cover 142, which is firmly held in place by the swinging latch 143. The can is held in its normal position firmly to its seat by a spring-latch 144, (see Fig. 8,) fastened to the side of the can and arranged to engage the upper edge of the support 101 between a pair of guide-lugs 145 thereon. (See Fig. 8$^c$.) The latch 144 is preferably projected through an opening in a lug 146, (see Fig. 8,) formed upon the bottom 123 of the can, which thus forms a supporting-strap about the latch and serves to prevent it from being broken or bent out of its proper position. The edge of the seed-plate 128, which projects into the annular feedway between the flange 126 of the cup-plate 125 and the edge of the opening 124, is provided with the series of notches 147, which thus form open-sided seed-cups for single kernels arranged lengthwise in circular series upon the periphery of the plate and which are closed at the bottom by the fixed supporting-ring 129. The latter is provided with an annular groove 148 (see Figs. 8 and 8$^e$) upon one side directly beneath the seed-cups 147, and the ring may be placed either with its plain or its grooved face next to the seed-plate to accommodate kernels of a small or large size. The plate rotates in the direction of the arrows (shown in Figs. 8, 8$^b$, and 8$^d$) and delivers the separate kernels to the discharge-opening 149, formed by a notch in the edge of the ring 129 at the rear side of the can. The bottom 123 is cut away opposite the discharge-opening, but is extended upwardly and to one side of the same to form a lug 150 inside of the can 37. (See Figs. 7, 8$^b$, and 8$^e$.) The cap-plate 125 is also cut away at this point, and in the opening thus formed is secured an irregular-shaped plate or support 151 by a bolt 152, passing through the cap-plate. Between the oppositely-disposed concentric faces of the plate 151 and the lug 150 is held the U-shaped cut-off 153, having a stud 154 pivotally engaging the plate 151. (See Fig. 8$^d$.) An ejecting-roll 155 is also held in place over the discharge-opening 149 between the parts 150 and 151 and beneath the U-shaped portion of the cut-off 153. The ends of a U-shaped spring 156 project through vertical slots 157 and 158 in the plate 151 and engage, respectively, with a central opening in the roller 155 and with an opening in the free end of cut-off 153. The inner end of the spring is rigidly held in place between a grooved plate 159 and a lug 160, having a corresponding groove, (see Fig. 7,) by a bolt 161. The cut-off and ejecting-roll are thus mounted upon independently-movable sections of the same spring and are conveniently removed by taking out the bolts 152 and 161. Moreover, the end of the spring 156, engaging the lower end of the slot 158, acts as a stop to position the cut-off close to the seed-plate 128, but prevents it from bearing against said plate, thus obviating all unnecessary wear upon the parts, which would otherwise soon interfere with their effective operation. The plate 151 is cut away at its lower edge (see Figs. 8$^d$ and 8$^e$) to form a passage 162, leading from between the free end of the cut-off 153 and the ejecting-roll 155 and opening into the seed-can beyond the latter, so that any second kernel which may pass in one of the seed-cups by the cut-off will be deflected by the ejecting-roll back into the supply. The flange 126 of the cap-plate 125 is cut away, as at 163, (see Figs. 8$^b$ and 8$^e$,) opposite the opening of the passage-way 162. This arrangement of the closely-adjacent cut-off and ejector have been found extremely effective in regularly discharging single kernels from the seed-cups as they pass successively over the discharge-opening. The edge of the opening 124 directly opposite the seed-plate 128 (see Figs. 7, 7$^b$, and 8$^b$) is beveled or inclined, as indicated at 124$^a$, toward the seed-plate from top to bottom through the greater part of its periphery, extending from a point somewhat beyond the ejecting-rollers to a point somewhat before the cut-off, so that the separate kernels may have free access to the open-sided seed-cups 147 of the plate 128, which will be uniformly charged with kernels. The angle of the bevel is greatest at the beginning and gradually diminishes toward the end, (see 8$^b$,) so that before the cut-off is reached the edge of the opening is vertical. By this means the kernels will enter the seed-cups 147 indiscriminately, but will be gradually uptilted or set on edge as the plate 128 revolves and before the cut-off 153 is reached, so that the seed-cups will be uniformly charged with single kernels placed edgewise, upon which the cut-off 153 and ejecting-roller 155 will act effectively and with great regularity to successively discharge the kernels from the seed-cups.

The present construction differs from prior constructions in which the seed enters the cups of the seed-plate edgewise, in that the seed enters the cups of the seed-plate 128 indiscriminately and is subsequently uptilted or set on edge therein before reaching the cut-off.

The discharge-opening 149 (see Fig. 7) is positioned over the throat 164, (see Fig. 8$^e$,) formed at the rear in the can-support 101 and which communicates with the upper end of the seed-tube 165, formed in the rear post 166 of the runner 36. The passage of seed through the tube is controlled by a pair of valves, an upper check-valve 167 and a lower drop-valve 168. Check-valve 167 is pivoted at its lower end between the upper ends of the sides of the hollow runner-post 166 and is provided at its upper end with a rearwardly-turned portion 169, which projects through openings in the opposite sides of the seed-tube 165 and normally obstructs the passage of seed therethrough. The lower drop-valve 168 is centrally pivoted, as at 170, within a cylindrical valve-seat 171, formed in the lower end of post 166 and having a discharge-opening 172. The valve comprises an inlet passage-way or port 173, of the same size as the seed-tube, and a second similar inlet passage-way or port 174 communicating therewith and having a common discharge passage or port 175 with a cut-off 176 between the inlets. The valve is normally held with its lower end in engagement with a stop 177, formed upon the valve-seat 171 and in such position that the inlet 173 communicates with the seed-tube 165, and the discharge 175 is closed by the valve-seat 171. A bent connecting-link 178 extends through the hollow post 166 and is pivoted to arms 179 and 180, connected, respectively, or formed in piece with the valves 167 and 168.

An operating rock-lever 181 is pivoted, as at 182, to the forward upper end of the runner and is provided with a forked rear end engaging a roller 183, mounted upon an arm 184, connected to or formed in piece with the valve 167. The forward end of the arm 181 is provided with a roller 185, engaging an inclined cam-slot 186, formed in a cam 187, which is secured upon the lower side of the trip-rod 99. (See Fig. 5.)

The shaft 102 is shown so geared to the seed-plate that a single revolution of the clutch mechanism and shaft will impart one-quarter of a revolution to plate 128, and thus carry three of the twelve seed-cups 147 with which it is provided over the discharge-opening, and so deliver three kernels through the discharge-opening 149 and throat 164 and upon the check-valve 167 at the upper end of the seed-tube 165.

In check-row planting one of the forks 92 and the trip-rod 99 is operated by each of the checks or tappets upon the check-row line to throw the seed-plate into gear with the planter-wheels, as described, for delivering three kernels to the check-valve 167. At the same time the trip-rod 99 acts directly upon the upper and lower valves through the medium of the cam 187 and the rocking lever 181 to shift them into the position shown by dotted lines in Fig. 7, so that the previously-received charge or hill upon the check-valve 167 is discharged through the seed-tube 165 upon the cut-off 176 of the drop-valve 168. Upon the reverse movement of the trip-rod 99 after the fork 92 has been released from the line-tappet both valves are returned to normal position, (shown in full lines in Fig. 7,) so that the check-valve 167 will receive the next three kernels delivered by the seed-plate 128, while the hill in the seed-tube will pass through the ports 173 and 175 and rest upon the valve-seat 171. At the next operation of the check-row mechanism the hill in the drop-valve 168 will be thrown or forced rearwardly through the opening 172 in the valve-seat into the ground, and since the speed of the force-drop valve will be in proportion with the speed of the team the hills will be dropped at uniform distances apart both with fast and slow teams. The gearing between the planter-wheels and the seed-plate is such that the seed-shaft 102 will be rotated through a single revolution to effect the discharge of a hill of kernels upon the check-valve 167 before the planter has traveled two-thirds the distance between the tappets on the check-row line, so that the seed-plate will be invariably and uniformly operated through the required distance between each of the tappets in spite of the ununiform rotation of the planter-wheels due to slipping or the irregularity of the surface of the ground. The drive-chain 104 may, moreover, be placed upon either of the different-sized sprockets 20, 21, or 22 upon the wheel-axle 16, so that the seed-plate will be driven at sufficient speed to complete its movement between the tappets of the check-row line, whatever may be the character of the ground. To insure regular operation of the seed-plate it is, however, desirable that it should be driven at as slow a speed as will insure its complete movement between tappets.

Seed-plates having cups of slightly-different lengths and widths may be supplied with each planter for seed of different sizes, the change of plates being readily effected, as previously described, by tilting or removing the seed-can, or plates having sixteen seed-cups may be used to deposit four kernels in a hill. The seed-plate will always be brought into position to register properly with the discharge-opening, since the notches 137, with which the arms 136 of the driving-gear 134 engage, are arranged opposite each one of the seed-cups 147, (see Fig. 8$^a$,) and since the horizontal gear 134 need not be removed or thrown out of mesh with the pinion 138 when changing plates no care is necessary in reassembling the parts after changing the plates, as in prior constructions. The lugs 130 (see Fig. 8) upon the supporting-ring 129 are so spaced upon its edge that while the ring may be secured in position with either side up it must be placed to bring the discharge-opening 149 therein in proper position. While it is not necessary to remove the gear 134 in changing the seed-plate, as with prior constructions, but to insure that it will be placed in proper position in assembling the parts four of the spaces between its teeth at a quarter-circle apart are shorter than the remaining spaces, (see Fig. 7,) and the beveled pinion 138 is provided with one short tooth for engaging such short spaces.

By the arrangement of the seed-plate 128 above and outside of the operating-gear 134 instead of inside, as with the usual constructions, the distances between the seed-cups 147 may be increased, thus insuring that they will be filled and discharged with single-grain kernels uniformly and successively. Furthermore, by providing the gear 134 with a central hub, mounted upon a fixed pivot 133 and connected to the gear-rim 134$^a$ by radial arms 134$^b$, instead of employing a mere annular gear, as heretofore used, in most cases the friction will be reduced to a minimum.

By the eccentric arrangement of the feed-opening 124 and seed-plate 128 in the bottom of the seed-can 37 the discharge-opening 149 and the seed-tube 165 are located at and beneath the extreme rear edge of the can, so that by cutting away the throat 164 upon its rear side a sight-feed opening 188 is formed, (see Figs. 7 and 8$^c$,) through which the discharge of the seed to the valve 167 may be readily observed by the driver, and any failure of the seed-supply or of the seeding mechanism is at once noted and corrected. Preferably a swinging gate 189 (see Fig. 7) is pivoted to the can 37 and extends over the upper part of sight-feed opening 188 to prevent kernels from rebounding out of the opening after striking the check-valve 167; but, as is apparent, the accumulation of the seeds upon the valve may still be seen.

In check-row planting the connection between the forks 92 and the reciprocating trip-bar 99 is such that the latter will only be shifted against the tension of its spring 122 (see Fig. 5) a sufficient distance to bring the lower part of the inclined cam-slot 186 into play, so that the valves 167 and 168 in the seed-tube will only be shifted into the position shown by dotted lines in Fig. 7; but by shifting the trip-bar 99 still farther toward the right-hand side of the planter the upper part of the cam-slot 186 will be brought into play (see dotted lines in Fig. 5) and the rock-lever 181 and connecting-link 178 will be operated to entirely withdraw the check-valve 167 from the seed-tube 165 and to move the lower valve 168 so that the port 174 will communicate with the lower end of the seed-tube, while the discharge-port 175 will communicate with the opening 172, (see Fig. 7ª,) and a free passage for single kernels will be established from the seed-plate to the heel of the furrow-shoes 36 for drill-planting. The upper and lower portions of the inclined cam-slot 186 for effecting the shift of the valves for drill-planting are preferably arranged out of line with one another, and the cam 187 itself is so shaped that the portion of the slot engaged by the roller 185 will be at all times at a fixed distance from the pivot 182 of the rock-arm 181, and the roller will not be cramped in the slot. The loose one-way slotted connections between the ends of the trip-bar 99 will permit this further shift of the bar 99 in drilling, and the latter will be held, both in check-rowing and drilling positions, by a stop-arm 190, pivoted to the bar 13, positioned intermediate the latter and the trip-bar 99 and arranged to engage a lug 191 upon the trip-bar, which is preferably, but not necessarily, formed by an extension of the detent 121. (See Figs. 1 and 5ᵇ.) The spring 122 is secured at one end to a bent hook 192, fixed upon the under side of the trip-bar 99, and at the other end by a link 193 to a lug 194 upon one side of the stop-arm 190. The latter is provided with a triangular-shaped stop 195, arranged to engage the bar 13 of the runner-frame. In check-rowing the stop-arm is swung to the right, (see Fig. 5,) with one side of the stop 195 against the bar 13 and with the lug 191 held against the flattened pivoted end of the arm 190 by the spring 122, as shown by full lines in Fig. 5. In drilling the stop-arm is shifted to the left, with the other side of the triangular-shaped stop 195 engaging the bar 13 and with the lug 191 held against the free end of the pivoted arm 190 by spring 122. It will be observed that in the first position the pull of the spring 122 is below the pivot of arm 190 and in the second position it is above the same, so that such spring not only serves to return the trip-bar 99 to normal in check-row planting, but also serves to lock the stop-arm 190 both in the check-rowing and drilling positions. The stop-arm is preferably provided with a cam-surface 196, which engages the lug 191 and serves to shift the trip-bar 99 to the drilling position as the stop-arm 190 is swung toward the left. The stop-arm may also, if desired, be provided with a toe-piece 197, by which the driver may change from check-rowing to drill-planting without getting down from his seat. It will be understood that in the drilling position the detent 121 is completely withdrawn from engaging with the clutch, so that the roller 118 on dog 117 is in constant engagement with one of the notches 113 of the disk 109, and the shaft 102 is driven continuously from the drive-axle 16, actuating the seed-plate to deliver single kernels one at a time to the unobstructed seed-tube.

It will be observed that since the seed separating and measuring mechanisms are driven entirely from the supporting or cover wheels, the check-rowing devices only serving to control the clutch mechanism for tripping it into gear, and since the friction-rollers 183 and 185 are interposed in the actuating connections for the seed-tube valves, the draft upon the check-row line will be very light, and there will be no danger of pulling its anchors from the ground or otherwise disturbing its alinement. It will further be observed that the planter may be very easily and quickly changed from check-rowing to drill-planting, that the seed are separated and discharged from the can with accuracy and regularity, that the seed-plates may be conveniently changed, and that numerous other advantages, as above pointed out, are derived from the construction set forth.

It will be understood that the claims are not limited to the details of construction shown and described, which simply illustrate the preferred form of embodying the invention in a structure or machine. It is obvious that numerous changes may be made by the skilled mechanic without departure from the essentials of the invention.

Having thus described my invention, what I claim as new, and desire to secure by Letters Patent, is—

1. In planters, the combination with the side bars of the main frame, the drive-shaft and the supporting-wheels fixed thereto, of a fixed rigid tubular cross-bar formed of a single piece and connecting said side bars within which said drive-shaft is journaled.

2. In planters, the combination with the side bars of the main frame, the drive-axle and the supporting-wheels fixed thereto, of a cross-bar rigidly connecting said side bars, said cross-bar comprising two tubular portions forming journal-boxes for said drive-axle, a driving-wheel fixed to said shaft intermediate said tubular portions and an arch rigidly connecting said portions and extending about said gear, said tubular portions and said arch being formed of a single piece.

3. In planters, the combination with the side bars of the frame, of a scrape-bar journaled to revolve in the rear ends of said side bars and means fixed to said scrape-bar for engaging the rear ends of each of said side bars, said scrape-bar thus forming a connecting frame member between the rear ends of said side bars.

4. In planters, the combination with the side bars of the frame, of a scraper-bar journaled at the rear in said side bars and means fixed to said scraper-bar engaging opposite sides of the ends of each side bar, said scraper-bar thus forming a connecting frame member between the rear ends of the side bars.

5. In planters, the combination with the side bars of the frame, of a scraper-bar, supports having rounded heads fixed to the rear end of each of said side bars wherein said scraper-bar is journaled, bent straps secured to said scraper-bar and arranged to engage opposite sides of the rounded heads on each of said supports, said rotatable scraper-bar thus forming a connecting frame member between the rear ends of said side bars.

6. In planters, the combination with the main wheel-frame and the runner-frame hinged thereto, of a driver's seat movably mounted on said main frame and shift mechanism connected to each of said frames and to said seat, said connecting shift mechanism being arranged to throw the driver's weight into positions to balance the weight of the runner-frame in riding position and to hold the furrow-shoes of said frame in the ground in planting position.

7. In planters, the combination of the main wheel-frame and the runner-frame hinged thereto, of a shift-lever extending between and pivotally connected to each of said frames, a driver's seat pivotally mounted on said main frame and connections between said seat and said shift-lever.

8. In planters, the combination of the main wheel-frame and the runner-frame hinged thereto, of a shift-lever extending between and pivotally connected to each of said frames, a driver's seat, front and rear supports therefor, one of which is pivoted to said main frame and the other to said shift-lever.

9. In planters, the combination with the rear main frame and the front runner-frame, of a shift-lever pivotally connected at its forward end to said runner-frame and intermediate its ends to said main frame, a driver's seat, having a rear support pivoted to said main frame and a front support pivoted to the rear end of said shift-lever.

10. In planters, the combination with the rear main frame and the front runner-frame, of a shift-lever pivotally connected at its forward end to said runner-frame and pivotally connected intermediate its end by a short link to said main frame, a driver's seat, a rear support connected to said seat and pivoted to said main frame, and a front support pivoted to said seat and to the rear end of said shift-lever.

11. In planters, the combination with the rear main frame and the front runner-frame, of a shift-lever having an operating hand-lever, pivoted at its front end to a rear extension on said runner-frame and pivotally connected intermediate its ends by a pair of short links to the center cross member of said main frame, a driver's seat, a pair of inclined rear supports connected to said seat and pivoted to the side bars of said main frame and a pair of front supports pivoted to said seat and to the rear end of said shift-lever.

12. In planters, the combination with the main frame and its supporting-wheels, of a scraper-bar journaled at the rear in said frame, means for actuating said bar to bring said scrapers adjacent the periphery of said wheels, and stops for preventing actual contact between said scraper and wheels.

13. In planters, the combination with the main frame and its supporting-wheels, of a scraper-bar journaled at the rear in said frame, supporting-sleeves rotatably and laterally adjustable upon the ends of said bar, scrapers carried by said sleeves, a foot-treadle connected to said bar for moving said scraper toward said wheels, and stops on said bar and on said frame for preventing actual contact between said scraper and wheels.

14. In planters, the combination with the side frame-bars and a scraper-bar journaled within but arranged to form a connecting frame member between the rear ends of said side bars, a support loosely mounted upon said scraper-bar, means for holding said support in a stationary central position thereon and a marker-holder pivoted to said support.

15. In planters, the combination with the side frame-bars and a central brace-strap parallel thereto, of a scraper-bar journaled in supports fixed upon the rear ends of said side bars and said central strap, means fixed to said scraper-bar engaging each of said supports to prevent lateral movement of said side bars and central strap in either direction, said bar thus forming a connection between said parts, and a marker-holder pivoted to said central support.

16. In planters, the combination with the side frame-bars and a scraper-bar journaled within but arranged to form a connecting frame member between the rear ends of said side bars, a support loosely mounted upon said scraper-bar, means for holding said support against rotation with said scraper-bar, a marker-holder pivoted on said support to swing in a vertical plane and a key fixed to said scraper-bars and arranged to engage a slot in said support to hold the same against longitudinal movement.

17. In planters, the combination with the main frame and its supporting-wheels, of a scraper-bar journaled in said frame, downwardly-extending scrapers and an upwardly-extending reel-support mounted on said bar, a check-line reel and an actuating friction-pulley therefor carried on said support, means for throwing said support in one direction to bring said friction-pulley into operative relation with said wheels and means for throwing said bar in the opposite direction to bring said scrapers into operative relation with said wheels.

18. In planters, the combination with the main frame and its supporting-wheels, of a tubular scraper-bar journaled at the rear in said frame, scrapers carried by said bar, a reel-support removably journaled within the end of said bar, a check-line reel and an actuating friction-pulley therefor carried on said support and two separate treadles, one connected to said bar and the other to said support for throwing said reel and scrapers into operation as required.

19. In planters, the combination with the main frame and its supporting-wheels, of an upright support arranged to be journaled on either side of said frame, a horizontal shaft carried upon the upper end of said support, a check-line reel and an actuating friction-pulley therefor, an arm mounted to swing about said shaft, a check-line guide mounted upon the free end of said arm, stops on said arm for holding said guide in proper position relatively to said reel, when the latter is mounted upon either side of said frame, and an operating connection pivoted to said arm, for moving said support to bring said friction-pulley into engagement with one of said wheels.

20. In planters, the combination with the main frame and its supporting-wheels, of a tubular scraper-bar journaled at the rear in said frame, scrapers carried by said bar, an angular support arranged to be journaled within either end of said tubular bar, a shaft fixed to the end of said support, a check-line reel and an actuating friction-pulley therefor, arranged to engage one of said wheels, mounted upon said shaft, a pair of connected arms mounted to swing about said shaft, a check-line guide carried upon the free ends of said arms, an operating link and treadle connected to one of said arms and stops on one of said arms oppositely arranged and spaced apart on either side of said support to hold the parts in proper position when upon either end of said scraper-bar.

21. In planters, the combination with the main frame and a runner-frame, comprising front and rear transverse bars, hinged to said main frame, of a draft-tongue, a support fixed to said front bar having a vertically-adjustable connection with said tongue, a second support fixed to said rear bar and having a convex bearing-surface upon which said tongue rests, a slot in said rear support and a bolt passing through said slot to secure said tongue to said support.

22. In planters, the combination with the main frame and a runner-frame, comprising front and rear transverse bars, hinged to said main frame, a draft-tongue, a support on said rear bar for said tongue and a front support having a vertically-adjustable connection with said tongue and a vertically-adjustable bolt-and-slot connection between said support and the front transverse bar of said runner-frame.

23. In planters, the combination with the main frame and the runner-frame, of a pivoted connection between each end of said runner-frame and said main frame, said pivoted connection being vertically adjustable and means for holding said connection in its adjusted position.

24. In planters, the combination with the rear wheel-frame and the front runner-frame, of a connecting-piece at each end of said runner-frame having a vertically-adjustable connection therewith and a pivoted connection with said main frame.

25. In planters, the combination with the seeding devices, of a check-row fork mounted to swing in a horizontal plane for controlling said devices, said fork being jointed intermediate its ends to swing in a vertical plane, and stops on the jointed parts arranged to prevent the outer end from dropping below a horizontal position.

26. In planters, the combination with the seed-cans and the seed measuring and separating mechanism therein, of a transverse operating-shaft for said mechanism, a continuously-driven loose clutch member and a tight clutch member on said shaft, a transverse reciprocating trip-bar for controlling said clutch members and check-row forks operatively connected to said trip-bar.

27. In planters, the combination with the seed-cans and the seed measuring and separating mechanism therein, of a transverse operating-shaft for said mechanism, a continuously-driven clutch-disk loose on said shaft and provided with notches on its face, a second clutch member fixed on said shaft having a stop-arm and a pivoted spring-pressed dog for engaging said notched disk, said arm and dog being arranged adjacent each other in a plane parallel to said shaft, a transverse reciprocating trip-bar, a detent fixed thereto arranged to engage said stop-arm and to control said pivoted dog and check-row forks operatively connected to said trip-bar.

28. In planters, the combination with the seed-cans and the seed measuring and separating mechanism therein, of a transverse operating-shaft for said mechanism, a continuously-driven clutch-disk loose on said shaft and provided with notches on its face, a second clutch-disk fixed to the shaft adjacent the notched face of said loose disk and having a peripheral flange arranged about said notched disk, a laterally-projecting stop-arm fixed on the periphery of said loose disk and having a cam-face and a stop-notch, a spring-pressed dog pivoted to said loose disk to swing in a plane at right angles thereto for engaging said notched disk, said dog being arranged adjacent said stop-arm, a transverse reciprocating trip-rod having a detent arranged to engage said stop-arm and check-row forks operatively connected to said trip-rod.

29. In planters, the combination with the seed-cans and the seed measuring and separating mechanism therein, of a tranverse operating-shaft for said mechanism, a clutch for throwing said shaft into operation, a transverse reciprocating trip-rod having a detent for tripping said clutch, check-row forks operatively connected to said trip-rod, said rod being movable independently of said forks to throw said detent out of operation for drill-planting.

30. In planters, the combination with the drive-axle, the seed-cans and the seed measuring and separating devices therein, of a transverse rotatable shaft for actuating said devices, a clutch mechanism for operatively connecting said shaft to said drive-axle, a transverse reciprocating trip-rod having a detent for controlling said clutch mechanism, check-row forks having loose, one-way connections with said trip-rod, and means for holding said rod and detent either into or out of operative relation with said clutch mechanism for check-rowing or drilling.

31. In planters, the combination with the drive-axle, the seed-cans and the seed measuring and separating devices therein, of a transverse rotatable shaft for actuating said devices, a clutch mechanism for operatively connecting said shaft to said drive-axle, a transverse reciprocating trip-rod having a detent for controlling said clutch mechanism, check-row forks operatively connected to said trip-rod, a pivoted stop-arm, a lug on said rod engaged by said arm and a spring extending between said arm and said trip-rod arranged to hold the same on either side of a central position, whereby said rod will be held in check-rowing or drilling position.

32. In planters, the combination with the drive-axle, the seed-cans and the seed measuring and separating devices therein, of a transverse rotatable shaft for actuating said devices, a clutch mechanism for operatively connecting said shaft to said drive-axle, a transverse reciprocating trip-rod having a detent for controlling said clutch mechanism, check-row forks operatively connected to said trip-rod, a stop-arm mounted on a fixed pivot, a lug on said trip-rod and a spring connected to said rod and arranged to hold said lug in engagement with said stop-arm, a cam-surface on said stop-arm extending between its ends for engagement with said lug, whereby said rod may be thrown into its inoperative or drilling position.

33. In planters, the combination with the drive-axle and the seed separating and measuring devices, of a transverse rotatable shaft for operating said devices, a clutch mechanism for coupling said shaft to said drive-axle, a transverse reciprocating trip-rod for controlling said clutch mechanism having slots in its ends, a pair of check-row forks having link connections engaging respectively with the inner and outer ends of said slots, and means for shifting said rod independently of said forks to an inoperative position and for holding the same in such position.

34. In planters, the combination with the drive-axle, the seed-cans having seed measuring and separating devices therein, the seed-tubes having drop-valves at their lower ends, of clutch mechanism for operatively connecting said drive-axle to said seeding devices, a transverse reciprocating trip-rod for controlling said clutch mechanism, operative connections between said rod and said drop-valves, check-row forks having loose, one-way connections with said rod, and means for holding said rod in position out of operative relation with said clutch mechanism and for holding said drop-valves open.

35. In planters, the combination with the drive-axle, the seed-cans having seed measuring and separating devices therein, the seed-tubes having drop-valves at their lower ends, of clutch mechanism for operatively connecting said drive-axle to said seeding devices, a transverse reciprocating trip-rod having a detent fixed thereto for controlling said clutch mechanism, cams having inclined cam-slots fixed to said rod, pivoted levers engaging said cam-slots and operatively connected to said drop-valves, longitudinal slots in the opposite ends of said trip-rod, check-row forks having link connections engaging said slots for shifting said rod in one direction, means for shifting said rod independently of said forks and for locking the same in shifted position for throwing said detent out of operative relation with said clutch mechanism and for holding said drop-valves open.

36. In planters, the combination with the seed-tubes and drop-valves at the lower ends thereof, of a transverse reciprocating trip-rod operatively connected to each of said drop-valves, check-row forks connected to opposite ends of said trip-rod, and means for holding said trip-rod in shifted position for holding said drop-valves open.

37. In planters, the combination with the seed-tubes and drop-valves at the lower ends thereof, of a transverse reciprocating trip-rod, cams having inclined cam-slots secured to said trip-rod, pivoted levers engaging said slots and operatively connected to said valves, longitudinal slots in the opposite ends of said trip-rod, check-row forks having link connections engaging said slots for shifting said rod in one direction, and means for shifting and holding said rod in shifted position to hold said drop-valves open.

38. In planters, the combination with the seed-tubes and drop-valves at the lower ends thereof, of a transverse reciprocating trip-rod operatively connected to each of said drop-valves, check-row forks connected to opposite ends of said trip-rod by loose, one-way connections, a lug on said rod, a shifting pivoted stop-arm arranged to engage said lock and a spring connected to said rod and to said arm and arranged to hold the latter on either side of a central position, for check-rowing or controlling.

39. In planters, the combination with the seed-cans, the seed separating and measuring devices therein and the seed-tube, of a cylindrical, centrally-pivoted drop-valve at the lower end of said seed-tube having a passage normally communicating therewith, said valve also having a cylindrical cut-off portion for closing said tube, a cylindrical valve-seat for said valve arranged to normally close the lower end of said passage and having a discharge-opening, and means for actuating said valve to simultaneously close said seed-tube and project the seed in said valve rearwardly through said discharge-opening.

40. In planters, the combination with the seed-cans, the seed separating and measuring devices therein, and the seed-tube, of a check-valve at the upper end of said tube, normally closing the same, a centrally-pivoted drop-valve at its lower end having a passage normally communicating with said seed-tube and a cut-off for closing the same, a cylindrical valve-seat for said drop-valve arranged to normally close the lower end of said passage and having a discharge-opening and means for simultaneously actuating said valves to open said seed-tube at its upper end, close it at its lower end and to project the seed in said drop-valve rearwardly through said discharge-opening.

41. In planters, the combination with the seed-cans, the seed separating and measuring devices therein and the seed-tube, of a pivoted check-valve at the upper end of said tube normally closing the same, a centrally-pivoted drop-valve at its lower end having a passage normally communicating with said seed-tube and a cut-off for closing the same, a cylindrical valve-seat for said drop-valve arranged to normally close the lower end of said passage and having a discharge-opening, an arm on each of said valves, a connecting-link pivoted to each of said arms, a reciprocating trip-rod, check-row forks connected thereto, a cam having an inclined cam-slot and a pivoted arm, the opposite ends of which operatively engage said cam-slot and said check-valve.

42. In planters, the combination with the seed-tube, of a cylindrical drop-valve at its lower end, a cylindrical valve-seat therefor having a discharge-opening, said valve having two passages arranged to communicate with said seed-tube and with said discharge-opening, one of said passages operating for check-rowing and the other for drilling, and means for shifting said valve for check-rowing and for holding said valve in drilling position.

43. In planters, the combination with the seed-tube, of a drop-valve at its lower end, a valve-seat therefor having a discharge-opening, said valve having a pair of inlet-passages arranged to communicate with said seed-tube and a common outlet-passage arranged to communicate with said discharge-opening and means for actuating said valve to alternately establish communication with said seed-tube and with said discharge-opening for hill-planting and for holding said valve in position to establish communication directly between said seed-tube and said discharge-opening for drill-planting.

44. In planters, the combination with the seed measuring and separating devices and the seed-tube, of a drop-valve at its lower end, a discharge-opening for said drop-valve, said drop-valve having a pair of passages with a cut-off between said passages and means for actuating said valves, bringing one of said passages alternately into communication with said seed-tube and with said discharge-opening and for establishing direct communication from said seed-tube to said discharge-opening through the other of said passages.

45. In planters, the combination with the seed measuring and separating devices and the seed-tube, of a drop-valve at its lower end, a discharge-opening for said drop-valve, said drop-valve having a pair of passages with a cut-off between said passages, a trip-rod, check-row forks having loose one-way connections therewith, a cam fixed on said trip-rod, operative connections with said valve, for intermittently operating said valve to convey seed from said tube to said discharge-opening in hill-planting, and said rod thus being shiftable independently of said forks to establish direct communication between said seed-tube and said discharge-opening for drill-planting, and means for holding said rod in such shifted position.

46. In planters, the combination with the seed measuring and separating devices, of a check-valve at its upper end, a centrally-pivoted drop-valve at its lower end having a pair of inlets with a cut-off between them and an outlet, a cylindrical valve-seat for said drop-valve having a discharge-opening at the rear, a reciprocating trip-rod having slotted ends, check-row forks having link connections with said slotted ends, cams having inclined cam-slots fixed in said rod, pivoted levers engaging said cams and operatively connected to said valves, and means for holding said trip-rod in check-rowing and drilling positions.

47. In planters, the combination with the drive-axle, the seed measuring and separating devices, and the seed-tube, of clutch mechanism for operatively connecting said seeding devices to said drive-axle, a check-valve in the upper end of said tube and a drop-valve in its lower end, said drop-valve having a pair of passages with a cut-off between them and a valve-seat with a discharge-opening, a trip-rod operatively connected to said valves and arranged to control said clutch mechanism, check-row forks connected to said rod for operating said clutch mechanism and valves in check-rowing, as described, and means for holding said rod in drilling position.

48. In planters, the combination with a seed-can, of a fixed support whereon said seed-can is movably mounted, a seed-plate revolubly and removably mounted upon the bottom of said can, a horizontal gear revolubly mounted below said can on said fixed support, means for detachably connecting said gear and said seed-plate and a drive-pinion meshing with said horizontal gear, said can thus being removable without disturbing the mesh of said gears.

49. In planters, the combination with a seed-can, of a fixed support whereon said seed-can is movably mounted, a seed-plate revolubly and removably mounted upon the bottom of said can and having a circular series of seed-cups and notches arranged opposite said cups, a horizontal gear revolubly mounted on said support beneath said can, lugs on said gear for engaging the notches of said seed-plate and a drive-pinion meshing with said horizontal gear.

50. In planters, the combination of a seed-can having a circular opening in its bottom, a cap-plate secured to said bottom and above said opening, with its edge spaced apart from the edge thereof to form a feedway, a seed-plate placed within said opening and against said top plate, and means detachably secured to the bottom of said can for holding said seed-plate revolubly in such position, a fixed support whereon said seed-can is movably mounted and a horizontal drive-gear for said seed-plate mounted on said fixed support.

51. In planters, the combination of a seed-can having a circular opening in its bottom, a cap-plate secured to said bottom and above said opening, with its edge spaced apart from the edge thereof to form a feedway, a seed-plate placed within said opening and against said top plate, a supporting-ring detachably secured to the bottom of said can for holding said seed-plate revolubly in such position, a fixed support whereon said seed-can is movably mounted, and a horizontal drive-gear for said seed-plate mounted on said fixed support.

52. In planters, the combination of a seed-can having a circular feedway in its bottom, a seed-plate having a circular series of seed-cups placed below said feedway and a supporting-ring for revolubly holding said plate in place, said ring arranged to be detachably secured to the bottom of said can with either face against said bottom and having an annular groove in one face below said seed-cups.

53. In planters, the combination with a seed-can having a seed-plate detachably and revolubly supported upon its bottom, of a fixed support for said can, openings in the upper face of said support, curved open hinged lugs fixed to the bottom of said can for engaging said openings and holding said can removably in position on said support, and stops on said lugs for engaging the edges of said openings when the can is in tilted position.

54. In planters, the combination with a seed-can having a seed-plate detachably and revolubly supported upon its bottom, of a fixed support for said can, an opening in said support, curved hinge-lugs fixed to said can for engaging said opening, a spring-latch fixed to said can for engaging said support, guides for said latch fixed to said support, and a supporting-strap for said latch fixed to said can.

55. In planters, the combination with a seed-can, of a discharge-opening and a seed-tube arranged respectively at and beneath the rear edge of the can-bottom, a circular feedway eccentrically arranged in the can-bottom, and communicating with said discharge-opening, a revoluble seed-plate in said feedway, a check-valve in the upper end of said seed-tube and a sight feed-opening at the top of said tube between said check-valve and said discharge-opening through which sight-opening the accumulation of seed, upon the check-valve may be observed.

56. In planters, a seed-can having an annular feedway in its bottom, a movable seed-plate within said feedway having notches in its edge forming open-sided seed-cups, a discharge-opening with which said seed-cups communicate, the edge of said feedway directly opposite the edge of said seed-plate being cut away to give the grains free access to the open sides of said seed-cups, and means for uptilting the grains on edge within said cups.

57. In planters, a seed-can having an annular feedway in its bottom, a rotatable plate having cells arranged in said feedway to receive the grains flatwise and means for uptilting the grains on edge within said cells.

58. In planters, a seed-can having an annular feedway in its bottom, a rotatable seed-plate having cells arranged within said feedway to receive the grains flatwise and a beveled wall arranged to uptilt the grains edgewise within said cells.

59. In planters, a seed-can having an annular feedway in its bottom, a seed-plate having cells arranged within said feedway to receive the grains flatwise and a wall having a gradually-diminishing bevel arranged to uptilt the grains on edge within said cells.

60. In planters, a seed-can having an annular feedway in its bottom, a rotatable seed-plate having notches in its edge forming open-sided seed-cups and arranged within said feedway to receive the grains flatwise and a beveled wall arranged to uptilt the grains on edge within said cells.

61. In planters, a seed-can having an annular feedway in its bottom, a rotatable seed-plate having a series of open-sided seed-cups extending lengthwise upon its periphery and arranged within said feedway to receive the grains flatwise and a beveled wall arranged to uptilt the grains edgewise within said cells.

62. In planters, a seed-can having an annular feedway in its bottom, a seed-plate notched on its edge to form open-sided seed-cells arranged within said feedway, the wall of said feedway being constructed to deliver the seed flatwise to said cells and to uptilt them edgewise therein.

63. In planters, the combination with a seed-can having an annular feedway in its bottom, a rotating seed-plate having open-sided seed-cups in its edge and a discharge-opening with which said seed-cups communicate, said feedway having a cut-away portion opposite the open sides of said seed-cups through a portion of its circumference but arranged closely adjacent the open sides of said seed-cups in front of said discharge-opening, the grains thus entering the seed-cells flatwise but being arranged edgewise therein before said discharge-opening is reached.

64. In planters, the combination with a seed-can having an annular feedway in its bottom, of a rotating feed-plate having notches in its edge forming open-sided seed-cups and arranged within said feedway and a discharge-opening with which said seed-cups communicate, said feedway having a gradually-diminishing cut-away portion directly opposite the edge of said seed-plate through a portion of its circumference, the seed thus entering the seed-cells flatwise but being arranged edgewise therein before reaching the discharge-opening.

65. In planters, the combination with a seed-can having an annular feedway in its bottom, a rotating seed-plate having notches in its edge forming open-sided seed-cups and a discharge-opening with which said seed-cups communicate, the wall of said feedway having a gradually-diminishing bevel directly opposite the edge of said seed-plate through a portion of its circumference and a vertical straight edge closely adjacent the edge of said seed-plate in front of said discharge-opening, the grains thus entering the seed-cells flatwise but being arranged edgewise therein before reaching the discharge-opening.

66. In planters, the combination with the seed-can, of an annular feedway in the can-bottom, a seed-plate in said feedway having notches in its edge forming open-sided seed-cups, a discharge-opening with which said seed-cups communicate, the edge of said feedway directly opposite the edge of said seed-plate being cut away through a portion of the circumference, but straight in front of said discharge-opening, the kernels thus having free access to the open sides of said seed-cups, but being arranged edgewise therein before the discharge-opening is reached.

67. In planters, the combination with the seed-can, of a circular feedway having a discharge-opening in the bottom of said can, a circular seed-plate within said feedway and having notches in its edge, forming a circular series of open-sided seed-cups arranged lengthwise upon the periphery of the plate, a suitable cut-off and ejector arranged at said discharge-opening, said feedway having a gradually-diminishing beveled edge opposite the edge of said seed-plate through a portion of the circumference and a straight edge in front of said cut-off, the seed-kernels thus having free access to said open-sided seed-cups but being arranged edgewise and lengthwise therein before said cut-off is reached.

68. In planters, the combination with the seed-can, of an opening in the bottom of said can and a cap-plate secured thereto and spaced apart from the edge of said opening to form a feedway, a revoluble seed-plate in said feedway and a discharge-opening beneath said plate, a tangentially-arranged lug fixed on said bottom, a supporting-plate removably secured in position upon said cap-plate, and arranged parallel to said lug, and a cut-off and an ejector movably held in place by and between said fixed lug and said supporting-plate.

69. In planters, the combination with the seed-can, the seed-plate and discharge-opening therein, of a tangentially-arranged supporting-plate removably secured in position, and a tangentially-arranged pivoted cut-off, and a vertically-movable ejector held in position between said plate and a fixed part.

70. In planters, the combination with the seed-can, the seed-plate and discharge-opening therein, of a tangentially-arranged supporting-plate removably secured in position and a pivoted U-shaped cut-off and a movable ejector held in place between said plate, said ejector being located within the U-shaped portion of said cut-off.

71. In planters, the combination with the seed-plate and the discharge-opening, of a pivoted cut-off, a support therefor, a spring-strip arranged to engage the free end of said cut-off and passing through an opening in said support, said spring acting as a stop for said cut-off as described.

72. In planters, the combination with the seed-can, the seed-plate and the discharge-opening, of a movable cut-off and ejector arranged at said discharge-opening, a U-shaped spring, the free ends of which are arranged to independently engage respectively with said cut-off and said ejector, and means for holding said spring in position.

73. In planters, the combination with the seed-can, the seed-plate and the discharge-opening, of a movable cut-off and ejector arranged adjacent said discharge-opening, a support for said cut-off and ejector, and a passage formed in said support leading from between said cut-off and said ejector and opening into said seed-can beyond the latter, seed in excess in the cups of said seed-plate being deflected through said passage.

74. In planters, the combination with the seed-tube and drop-valve and the reciprocating trip-rod, of a pivot-lever operatively connected to said valve, a cam having an inclined cam-slot engaging the end of said lever, said cam being of such shape that the part of the slot engaging the end of the lever will be at equal distance from the pivot thereof.

ABRAHAM ANDERSON.

Witnesses:
PATRICK J. TOBIN,
JAMES H. WEEKS.